(12) United States Patent
Peschina et al.

(10) Patent No.: US 12,249,881 B2
(45) Date of Patent: Mar. 11, 2025

(54) MANUFACTURING SYSTEM FOR MANUFACTURING A STATOR WITH BAR CONDUCTORS

(71) Applicant: FELSOMAT GmbH & Co. KG, Koenigsbach-Stein (DE)

(72) Inventors: Juergen Peschina, Knittlingen (DE); Stefan Frommer, Maulbronn (DE)

(73) Assignee: FELSOMAT GmbH & Co. KG, Koenigsbach-Stein (DE)

( * ) Notice: Subject to any disclaimer, the term of this patent is extended or adjusted under 35 U.S.C. 154(b) by 450 days.

(21) Appl. No.: 17/649,354

(22) Filed: Jan. 29, 2022

(65) Prior Publication Data

US 2022/0158530 A1 May 19, 2022

Related U.S. Application Data

(63) Continuation of application No. PCT/EP2020/070840, filed on Jul. 23, 2020.

(30) Foreign Application Priority Data

Aug. 7, 2019 (DE) .......................... 102019211859.3

(51) Int. Cl.
*H02K 15/00* (2006.01)
*H02K 15/02* (2006.01)
(Continued)

(52) U.S. Cl.
CPC ......... *H02K 15/0081* (2013.01); *H02K 15/02* (2013.01); *H02K 15/0414* (2013.01)

(58) Field of Classification Search
CPC ............... H02K 15/0081; H02K 15/02; H02K 15/0414; H02K 15/064
See application file for complete search history.

(56) References Cited

U.S. PATENT DOCUMENTS

| 4,965,924 A | 10/1990 | Santandrea et al. |
| 5,065,499 A | 11/1991 | Santandrea et al. |
| (Continued) | | |

FOREIGN PATENT DOCUMENTS

| CN | 104810992 A | * | 7/2015 |
| CN | 106416019 A | | 2/2017 |
| (Continued) | | | |

*Primary Examiner* — Aneeta Yodichkas
*Assistant Examiner* — Jose K Abraham
(74) *Attorney, Agent, or Firm* — Orbit IP, LLP; Marc G. Martino (57) ABSTRACT

A manufacturing system for manufacturing a stator for an electric machine, in particular an electric motor, wherein the stator has a main part and a plurality of bent and/or straight bar conductors. The manufacturing system has the following: a bending machine for bending free ends of the bar conductors, a spreading machine for spreading the free ends of the bar conductors in the radial direction, a welding machine for welding the free ends of at least two bar conductors, and a holding device for the stator. The holding device has at least one first set of fingers for engaging between the bar conductors at a first end face of the main part. The holding device can be secured to the bending machine, the spreading machine, and the welding machine. The manufacturing system facilitates an accelerated and inexpensive manufacture of stators with bar conductors.

14 Claims, 7 Drawing Sheets

(51) Int. Cl.
*H02K 15/04* (2006.01)
*H02K 15/0414* (2025.01)

(56) References Cited

U.S. PATENT DOCUMENTS

| | | | |
|---|---|---|---|
| 6,841,913 B2* | 1/2005 | Gorohata | H02K 3/12 |
| | | | 29/598 |
| 2001/0013167 A1* | 8/2001 | Maeda | H02K 15/0428 |
| | | | 29/868 |
| 2004/0006866 A1* | 1/2004 | Kato | H02K 15/0081 |
| | | | 29/598 |
| 2004/0074080 A1* | 4/2004 | Kato | H02K 15/0414 |
| | | | 29/606 |
| 2004/0172805 A1* | 9/2004 | Tokizawa | H02K 15/0037 |
| | | | 29/598 |
| 2005/0166393 A1 | 8/2005 | Sawada | |
| 2013/0104381 A1* | 5/2013 | Guercioni | H02K 15/0081 |
| | | | 29/559 |
| 2014/0007415 A1 | 1/2014 | Corbinelli et al. | |
| 2014/0090240 A1 | 4/2014 | Ponzio et al. | |
| 2015/0180319 A1 | 6/2015 | Kimura et al. | |
| 2017/0025932 A1 | 1/2017 | Radtke et al. | |
| 2017/0040858 A1 | 2/2017 | Darras et al. | |
| 2017/0141660 A1* | 5/2017 | Hashimoto | H02K 15/085 |
| 2019/0190359 A1* | 6/2019 | Miyawaki | H02K 3/04 |
| 2020/0195102 A1 | 6/2020 | Falkner et al. | |
| 2020/0350806 A1* | 11/2020 | Falkner | H02K 15/0087 |
| 2021/0296972 A1 | 9/2021 | Ponzio et al. | |

FOREIGN PATENT DOCUMENTS

| | | |
|---|---|---|
| CN | 106464097 A | 2/2017 |
| CN | 109983675 A | 7/2019 |
| DE | 689 19 655 T2 | 6/1995 |
| EP | 3 051 669 A1 | 8/2016 |
| GB | 2 290 040 A | 12/1995 |
| JP | 2016-063588 A | 4/2016 |
| WO | 2012/007972 A1 | 1/2012 |
| WO | 2018/065318 A1 | 4/2018 |
| WO | 2019/040958 A1 | 7/2019 |
| WO | 2019/040960 A1 | 7/2019 |

* cited by examiner

MANUFACTURING SYSTEM FOR MANUFACTURING A STATOR WITH BAR CONDUCTORS

CROSS-REFERENCE TO RELATED APPLICATIONS

This continuation application claims priority to PCT/EP2020/070840 filed on Jul. 23, 2020 which has published as WO 2021/023519 A1 and also the German application number 10 2019 211 859.3 filed on Aug. 7, 2019, the entire contents of which are fully incorporated herein with these references.

DESCRIPTION

Field of the Invention

The invention relates to a manufacturing system for manufacturing a stator for an electric machine, in particular an electric motor, wherein the stator has a main body and a multiplicity of bent or straight bar conductors. The invention furthermore relates to a method for manufacturing a stator for an electric machine, in particular an electric motor, wherein the stator has a main body and a multiplicity of straight or bent bar conductors.

Background of the Invention

Electric machines, for example electric motors, in many instances have a stator with a so-called coil winding. The coil winding is traditionally produced by winding a wire. However, such winding methods are technically complex and are subject to technical limitations. Moreover, the winding density (proportion of the area of the wire in a wound cross section) is limited in the case of wound coils.

Alternatively, coils of stators of electric machines can also be configured by bar conductors which are connected to one another and are inserted into a main body of the stator. Electric motors having stators with bar conductors are increasingly used in particular in the field of motor vehicles which are able to be driven (or are driven, respectively) by electric motors. In order for two bar conductors to be connected to one another, the free ends of said bar conductors are typically welded to one another. Prior thereto, the bar conductors are usually bent in such a manner that the free ends of two bar conductors to be welded are mutually converged. Furthermore, the free ends of the bar conductors prior to welding are in most instances spread apart in the radial direction such that bar conductors that are not to be welded to one another do not contact one another. The handling and fixing of the stator with the bar conductors to date, according to the prior art, has been very complex

SUMMARY OF THE INVENTION

Object of the Invention

The invention is based on the object of specifying a manufacturing system and a manufacturing method for accelerated and cost-effective manufacturing of stators with bar conductors.

Brief Description of the Invention

This object is achieved by a manufacturing system for manufacturing a stator for an electric machine, in particular an electric motor, wherein the stator has a main body and a multiplicity of bent and/or straight bar conductors, wherein the manufacturing system has the following:

a bending machine for a bending free ends of the bar conductors;

a spreading machine for spreading apart the free ends of the bar conductors in the radial direction;

a welding machine for welding the free ends of in each case at least two bar conductors; a holding device for the stator;

wherein the holding device has at least a first set of fingers for engaging between the bar conductors at a first end side of the main body; and wherein the holding device is able to be affixed on the bending machine, the spreading machine and the welding machine.

According to the invention, the holding device serves for handling the stator and fixing the latter to the individual machines of the manufacturing system. While a stator is processed by the machines of the manufacturing system, the stator is in principle not released from the holding device but remains held in the latter. The manufacturing system permits the manufacturing of the stator without providing in each case special receptacles for the type of stator to be manufactured on the individual machines. The holding device thus forms an intermediate element for connecting the stator to the individual machines. Receptacle or holding installations, respectively, on the machines can thus be embodied in a simpler and more cost-effective manner because said receptacle or holding installations, respectively, have to be adapted only to the holding device. The fastening of the stator to the individual machines can also be accelerated as a result of the holding device. In particular, it is not necessary for the main body and the bar conductors to be fixed in a complex manner on each of the machines. The holding device can have a set of coupling elements for affixing on the machines. The individual machines typically have in each case a set of corresponding mating coupling elements. In the case of dissimilar types of stators, in particular having different dimensions (length and diameter, for example), the mating coupling elements on the machines of the manufacturing system remain identical; only dissimilar holding devices (which are specially adapted to the respective type of stator, for example in terms of length and diameter) are provided. The bending machine, the spreading machine and the welding machine can therefore be used without modification for manufacturing dissimilar types of stators. The holding device can also be universally used for handling the stator outside the manufacturing system.

The holding device has at least a first set of fingers. The fingers serve for engaging between the bar conductors at a first end side of the main body. When the fingers engage between the bar conductors, said fingers typically engage across the main body at least in regions. Therefore, the main body can be fixed at least in a first direction by the fingers of the first set. The bar conductors can be fixed and aligned as a result of the fingers engaging between the bar conductors. The fingers typically bear on the bar conductors when said fingers engage between the latter.

In principle, the fingers of the holding device are able to be moved in the radial direction between an opened position (disengaged in a radially outward manner) and a closed position (engaged in a radially inward manner). In the opened position of the fingers, the stator can be inserted into the holding device and retrieved from the holding device. The fingers typically have at least one shoulder, preferably two shoulders, for radially bracing the bar conductors. As a result, the bar conductors can be aligned in a particularly precise manner.

The bending machine serves for bending the free ends of the bar conductors such that free ends of at least two bar conductors that are be welded to one another are mutually converged. The spreading machine serves for spreading apart the free ends of the bar conductors in the radial direction. As a result of the spreading apart it can be avoided that ends of bar conductors that are not to be welded to one another, or are not welded to one another, respectively, do contact one another. The welding machine serves for welding the free ends of in each case at least two bar conductors. It is typically provided that between two and six, in special cases even more, bar conductors are in each case welded to one another. The welding machine can have a laser welding installation. The manufacturing system is typically specified for applying the aforementioned machines to a stator to be manufactured in this sequence. Alternatively, the manufacturing system can in particular be specified for applying the spreading machine prior to the bending machine.

In principle, the bar conductors are disposed in a plurality of annular tiers, or concentric rings, respectively, in the main body of the stator. The main body is typically configured as a laminated core. Potentially, the bar conductors are to be welded at least in part at both ends (on both sides of the main body). In this case, the bar conductors in most instances are (originally) configured so as to be straight. Straight bar conductors can also serve for electrically contacting the stator. Alternatively, the bar conductors at least in part can be bent in a U-shape, in the manner of a hairpin. As a result of the portion bent in a U-shape, a connection between the, in most instances straight, longitudinal portions of the bar conductors that extend through the main body is thus established on one side of the main body.

The manufacturing system according to the invention is suitable in particular for carrying out a manufacturing method according to the invention as described below. The manufacturing system according to the invention is preferably used for carrying out a manufacturing method according to the invention as described below.

Preferred Embodiments of the Invention

According to one preferred embodiment, the manufacturing system furthermore has a loading and unloading station for the holding device. The loading and unloading station can facilitate the interlinking of the manufacturing system with further installations. The loading and unloading station can serve for inserting the preassembled components (main body and bar conductors) of the stator into the holding device, and for retrieving the processed stator from the holding device. Alternatively, the loading and unloading station can serve for introducing and discharging holding devices (with stators). The holding device is typically also able to be affixed on the loading and unloading station.

An embodiment of the manufacturing system in which the holding device has a uniform interface for establishing the holding device on the bending machine, the spreading machine and the welding machine is particularly preferred. As a result, the holding device can be constructed in a particularly simple manner; in particular, no special interfaces individually adapted to the individual machines are required. The bending machine, the spreading machine and the welding machine have in each case a receptacle installation which complements the interface of the holding device. Optionally, the loading and unloading station can also have a receptacle installation which complements the interface of the holding device such that the holding device can be established on the loading and unloading station by way of the uniform interface.

The manufacturing system furthermore particularly preferably has a handling apparatus for moving the holding device to the bending machine, the spreading machine and the welding machine, in particular wherein the holding device has a coupling portion, preferably a quick-change coupling portion, for the handling apparatus. The handling apparatus optionally also serves for moving the holding device to the loading and unloading station. The manufacturing of the stator within the manufacturing system can be further automated as a result of the handling apparatus. The handling apparatus can have a rotary table. A gripper for the holding device is preferably disposed on the rotary table.

In a particularly advantageous embodiment of the manufacturing system it is provided that the holding device has a first component of a centering clamping system, in particular of a zero-point clamping system, and that the bending machine, the spreading machine and the welding machine have in each case a complementary component of the centering clamping system. Optionally, the loading and unloading station can also have a complementary component of the centering clamping system. A centering clamping system permits the holding device to be fixed in a particularly precise manner on the machines.

One preferred embodiment of the manufacturing system is characterized in that the holding device has a centering element for radially bearing the fingers of the first set. The centering element can improve the accuracy of the positioning of the stator; to this end, the centering element can in particular have the effect that the fingers are in each case moved radially inward to the same extend. The centering element can be configured in the manner of a disk disposed centrally in the holding device. In the clamped state (in the case of a closed holding device, that is to say with fingers retracted in a radially inward manner) the bar conductors of a radially innermost tier also bear, typically directly, on the centering element. The centering element in this instance then notably also increases the accuracy of the alignment of the free ends of the bar conductors. The fingers of the first set for bearing on the centering element can engage radially from the outside in a circumferential groove of the centering element.

An embodiment of the manufacturing system in which it is provided that the fingers, between an engagement portion and a drive portion of the respective finger, have in each case an elastic element is also advantageous. In other words, the engagement portion and the drive portion of the fingers are in each case connected to one another by an elastic element. Fingers having an elastic element are particularly suitable for bracing the bar conductors. In particular, the drive portion of the fingers can be able to be activated in a path controlled manner. The engagement portions of the fingers are then in each case kinematically decoupled from the drive portion by the elastic elements. In particular, the elastic element enables the engagement portion to be displaced toward the drive portion with increasing force. The elastic element can be configured as a spring, in particular a cylindrical coil spring.

One preferred embodiment of the manufacturing system is characterized in that the holding device has a first rotatable cam disk for displacing the fingers of the first set. A common drive of all fingers of the first set can be specified by way of the first cam disk. The fingers typically engage in grooves of the first cam disk by way of pins. The first cam disk is preferably able to be driven by a slide gate. The slide gate can have a securing means which in a non-activated state precludes any displacement of the slide gate. An activation element for the securing means can be provided on a loading and unloading station. The securing means can be unblocked by way of said activation element when the holding device is connected to the loading and unloading station, in particular by way of a uniform interface.

An embodiment of the manufacturing system in which the holding device has a second set of fingers for engaging between the bar conductors at a second end side of the main body is particularly preferred. When the fingers of the second set engage between the bar conductors, said fingers typically engage across the main body at least in regions on the second end side, the latter being opposite the first end side. Therefore, the main body can be fixed in a second direction by the fingers of the second set. Conjointly, the fingers of the first and of the second set can completely fix the main body, in particular along the axial direction of the latter. The fingers of the second set can be designed like the fingers of the first set; in particular, the fingers of the second set can also have two portions which are mutually supported in a resilient manner.

In an advantageous refinement of this embodiment it is provided that the holding device has a second rotatable cam disk for displacing the fingers of the second set. A common drive of all fingers of the second set can be specified by way of the second cam disk. The fingers typically engage in grooves of the second cam disk by way of pins.

In a manufacturing system of which the holding device has a first and a second cam disk, it is preferably provided that the two cam disks are able to be driven by a common slide gate. The opening and closing of the holding device is simplified as a result.

It can be provided that the slide gate has a securing means which in an non-activated state precludes any displacement of the slide gate. When the aforementioned manufacturing system additionally has a loading and unloading station, it can furthermore be provided that an activation element for the securing means is configured on the loading and unloading station. The activation element can convert the securing means to a non-activated state when the holding device is affixed on the loading and unloading station. It can in particular be provided that the activation element automatically moves the securing means to the activated position when the holding device is fixed to the loading and unloading station. The slide gate can be displaced in the activated state of the securing means. In contrast, when the holding device is released from the loading and unloading station, the securing means prevents any (unintentional) opening of the holding device.

A particularly preferred embodiment of the manufacturing system is characterized in that the bending machine, the spreading machine and the welding machine form a first manufacturing circuit for circulating the holding device, that the manufacturing system has a further spreading machine, a further welding machine and a further holding device for a stator, and that the bending machine, the further spreading machine and the further welding machine form a second manufacturing circuit for circulating the further holding device. In other words, the holding device in the first manufacturing circuit circulates between the bending machine, the spreading machine and the welding machine, and the further holding device in the second manufacturing circuit circulates between the bending machine, the further spreading machine and the further welding machine. The bending machine is consequently part of both manufacturing circuits. In most instances, the bending machine is very expensive in comparison to the further machines. Therefore, costs can be saved by using a single bending machine in two manufacturing circuits. The cycle time of the bending machine is in most instances substantially shorter than the cycle time of the welding machines. The bending machine can therefore be better utilized by using two welding machines together with one bending machine. To the extent present, the handling apparatus and the loading and unloading station are also part of the first manufacturing circuit. The manufacturing system preferably has a further handling apparatus and/or a further loading and unloading station, said further handling apparatus and said further loading and unloading station being part of the second manufacturing circuit. The further spreading machine, the further welding machine and the further holding device, and also optionally the further handling apparatus and/or the further loading and unloading station, are typically configured like the (first) spreading machine, the (first) welding machine, the (first) holding device, the (first) handling apparatus, or the (first) loading and unloading station, respectively. The further handling apparatus serves in principle for moving the further holding device to the bending machine, the further spreading machine and the further welding machine, and also optionally the further loading and unloading station. The further spreading machine, the further welding machine, the further holding device and optionally the further loading and unloading station are advantageously arranged so as to be (mirror-)symmetrical in relation to the bending machine. This simplifies the circulation of the holding devices in the respective manufacturing circuits thereof.

In one preferred embodiment of the manufacturing system it is provided that the manufacturing system has a common platform on which the components of the manufacturing system are arranged. This simplifies the transportation of the manufacturing system. Moreover, the manufacturing system can be readily incorporated in a superordinate manufacturing line by way of the common platform.

Holding Device According to the Invention

The scope of the invention also includes a holding device for a manufacturing system according to the invention as described above. Provided according to the invention is thus a holding device for a stator having a main body and a multiplicity of bent and/or straight bar conductors. The holding device has at least a first set of fingers for engaging between the bar conductors at a first end side of the main body.

The holding device can have a uniform interface for affixing the holding device on machines of a manufacturing system, in particular on the bending machine, the spreading machine and the welding machine, and also optionally the loading and unloading station of a manufacturing system according to the invention as described above. Alternatively or additionally, the holding device can have a coupling portion, preferably a quick-change coupling portion, in particular for a handling apparatus. The holding device can have a first component of a centering clamping system, in particular of a zero-point clamping system. It is preferably provided that the holding device has a centering element for radially bearing the fingers of the first set. The fingers of the first set, between an engagement portion and a drive portion of the respective finger, can have in each case an elastic element. It is advantageously provided that the holding device has a first rotatable cam disk for displacing the fingers of the first set. The holding device can have a second set of fingers for engaging between the bar conductors at a second end side of the main body. An embodiment in which the holding device has a second rotatable cam disk for displacing the fingers of the second set is particularly preferred. The two cam disks are very particularly preferably able to be driven by a common slide gate. The slide gate can have a securing means which in a non-activated state precludes any displacement of the slide gate.

The holding device according to the invention can have further features of the holding device of the manufacturing system described above. By means of the holding device according to the invention, the advantages described above can in particular also be utilized outside the manufacturing system according to the invention.

Manufacturing Method According to the Invention

The scope of the invention also includes a method for manufacturing a stator for an electric machine, in particular an electric motor, wherein the stator has a main body and a multiplicity of straight and/or bent bar conductors. The method is preferably carried out using a manufacturing system according to the invention as described above. The method comprises the following steps:
  a) affixing, in particular clamping, the main body and the bar conductors in a holding device, wherein fingers of the holding device engage between the bar conductors;
  b1) moving the holding device to a bending machine and bending free ends of the bar conductors;
  b2) moving the holding device to a spreading machine and spreading apart the free ends in the radial direction;
  c) moving the holding device to a welding machine and welding the free ends of in each case at least two of the bar conductors;
  d) releasing the stator in the holding device, wherein the fingers are disengaged from between the bar conductors, and retrieving the stator from the holding device.

While carrying out steps b1), b2) and c) the stator remains affixed in the holding device. Sub-steps b1) and b2) may be carried out in an arbitrary sequence. Depending on the type of stator it may be advantageous to firstly carry out sub-step b1) and subsequently sub-step b2), or vice versa. The remaining steps of the method are carried out in the sequence stated. In particular, step a) is carried out prior to sub-step b1) or b2) to be carried out first. Steps c) and d) in the sequences stated are carried out after sub-step b1) or b2) carried out last. In order for the stator to be positioned for carrying out the manufacturing operations in steps b1), b2) and c), the holding device can be fixed to the respective machines. Fixing the stator directly to the individual machines, which is time-consuming and requires complex devices, is thus dispensed with. As a result of the engagement of the fingers of the holding device it can furthermore be ensured that the bar conductors are not unintentionally displaced relative to the main body during the further course of the method.

It is preferably provided that steps a) and d) are carried out in a loading and unloading station, and that the holding device between steps c) and d) is moved to the loading and unloading station. The loading and unloading station can facilitate the interlinking of the manufacturing system with further installations. For carrying out steps a) and d), the holding device is typically affixed on the loading and unloading station. This simplifies carrying out steps a) and d).

Use According to the Invention

The scope of the present invention furthermore includes the use of a manufacturing system according to the invention as described above in a method according to the invention as described above, said use being characterized in that initially at least one method cycle takes place using a first holding device, and in that subsequently at least one method cycle takes place using a second holding device for a stator of another type. The stator of another type can in particular be of a different size. The use according to the invention enables a particularly simple, rapid and cost-effective retooling of the manufacturing sequence from a first type of stator to the other type of stator. As a result of the use of the holding devices, the requirement of retooling the individual machines in terms of fastening mechanisms for the stator of the other type is in particular dispensed with. The second holding device is able to be affixed on the bending machine, the spreading machine, the welding machine, and also optionally the loading and unloading station in the same manner as the first holding device. The two holding devices can in particular be connected to the machines of the manufacturing system by way of interfaces which are in each case of an identical type. The second holding device preferably likewise has the same uniform interface for establishing the second holding device on the bending machine, the spreading machine and the welding machine, and also optionally the loading and unloading station, as the first holding device.

Further advantages of the invention are derived from the description and the drawing. According to the invention, the features mentioned above and those yet to be discussed in more detail can in each case be used individually or in arbitrary combinations with one another. The embodiments shown and described are not to be understood to be an exhaustive enumeration but rather have an exemplary character in terms of setting out the invention.

BRIEF DESCRIPTION OF THE DRAWINGS

The invention is illustrated in the drawing and will be explained in more detail by means of exemplary embodiments. In the drawing.

DETAILED DESCRIPTION OF THE PREFERRED EMBODIMENTS

Figure 1:
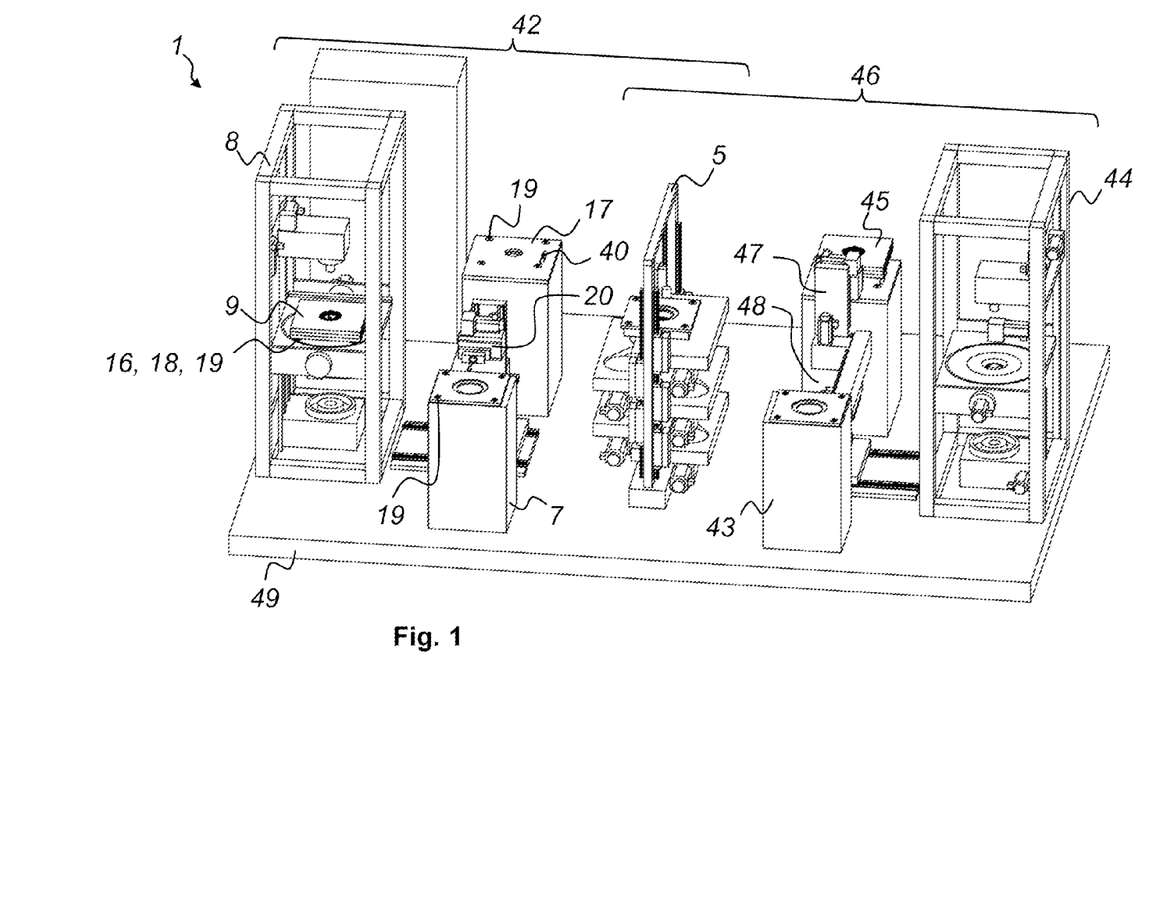
FIG. 1 shows a manufacturing system according to the invention having a bending machine which is part of two manufacturing circuits having in each case one spreading machine, one welding machine, one loading and unloading station and also one handling apparatus, wherein one holding device according to the invention is in each case provided for one stator in each of the manufacturing circuits, in a schematic view.

FIG. 1 shows an embodiment of a manufacturing system 1 according to the invention. Two manufacturing circuits 42, 46 are set up in the manufacturing system 1. Each of the manufacturing circuits 42, 46 serves for manufacturing stators (cf. FIG. 2a, 2b) for electric machines such as electric motors.

Figure 2A:
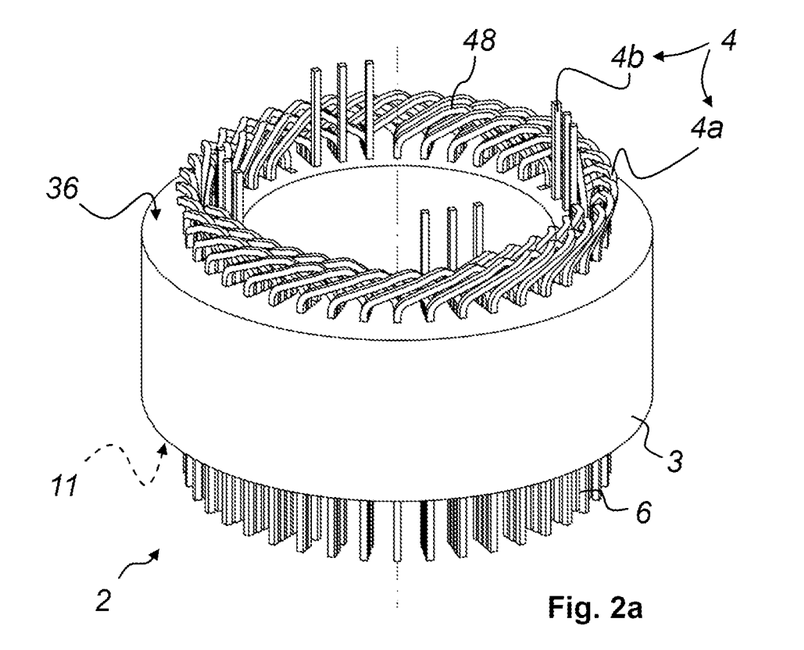
FIG. 2a shows a stator having straight and bent bar conductors, in a schematic perspective view.

A stator 2 is illustrated in a perspective view in FIG. 2a. The stator 2 has a main body 3. The main body 3 is configured with a laminated sheet metal core. The stator 2 furthermore has a multiplicity of bar conductors 4. Some of the bar conductors 4 are configured as bent bar conductors 4a and some are configured as straight bar conductors 4b. Free ends 6 of the bar conductors 4 protrude beyond a first end side 11 of the main body 3. The bent bar conductors 4a have in each case a connection portion 48 which is disposed above a second end side 36 of the main body 3. The bent bar conductors 4a have in each case two free ends 6 which are disposed on the first end side 11 of the main body 3 so as to face away from the connection portions 48. Reference below is made to the bar conductors 4 without further differentiation. The manufacturing system 1 of FIG. 1 serves in particular for welding the free ends 6 of the bar conductors 4, once free ends 6 that are to be welded to one another have been mutually converged by bending the bar conductors 4.

Figure 2B:
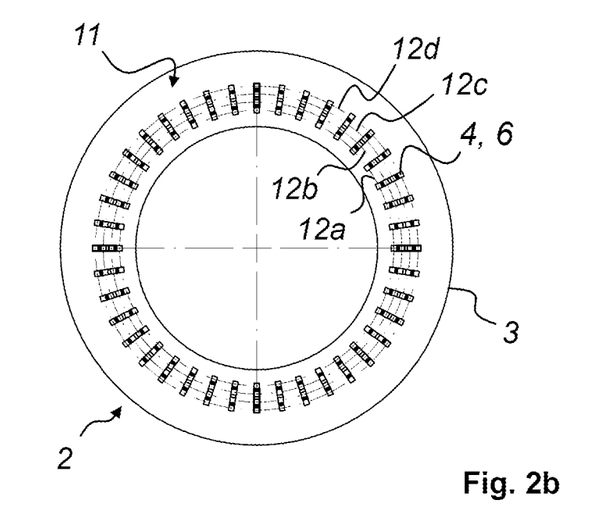
FIG. 2b shows the stator of FIG. 2a in a schematic plan view of a first end side.

FIG. 2b shows the stator 2 in a plan view of the first end side 11. The bar conductors 4 here are disposed in four annular tiers 12a-12d. Depending on the type of stator, fewer or more than four annular tiers can be provided, in particular up to ten annular tiers (not illustrated in more detail). The annular tiers 12a-12d here are disposed as concentric rings. The bar conductors 4 of the four tiers 12a-12d succeed one another in the radial direction; in other words, said bar conductors in the circumferential direction are disposed at the same (angular) positions.

The manufacturing system 1 (cf. FIG. 1) comprises a bending machine 5. The bending machine 5 serves for bending the free ends 6 of the bar conductors 4 such that the latter are mutually converged for welding. The bending machine 5 is part of the two manufacturing circuits 42 and 46.

The manufacturing system 1 for the first manufacturing circuit 42 also comprises a spreading machine 7, a welding machine 8, a loading and unloading station 17 and a handling apparatus 20. The manufacturing system 1 for the second manufacturing circuit 46 also comprises a further spreading machine 43, a further welding machine 44, a further loading and unloading station 48 and a further handling apparatus 47. The manufacturing system 1 comprises a holding device 9 according to the invention which circulates in the first manufacturing circuit 42. The manufacturing system 1 furthermore comprises a further holding device 45 according to the invention which circulates in the second manufacturing circuit 46. The aforementioned components of the manufacturing system 1 are arranged on a common platform 49. In particular, the components of the two manufacturing circuits 42, 46 (with the exception of the holding devices 9, 45) are arranged so as to be mirror-symmetrical in relation to a vertical mirror plane that runs through the bending machine 5. In terms of construction, the further components 43, 44, 45, 47, 48 which are associated with the second manufacturing circuit 46 are identical to the components 7, 8, 9, 20, 17 of the first manufacturing circuit 42.

The stators 2 to be manufactured are fixed in the holding devices 9, 45. The stators 2 by means of the holding devices 9, 45 are transported between the individual machines of the manufacturing circuits 42, 46 and fastened to the machines. The handing apparatuses 20, 47 serve for transporting the holding devices 9, 45.

In a manufacturing cycle in one of the manufacturing circuits 42 or 46, respectively, the individual parts (main body 3, bar conductors 4) of the stator (for instance by way of a gantry system not illustrated in more detail) are firstly inserted into the holding device 9 or 45 that is fastened to the loading and unloading station 20 or 48, respectively. The handling apparatus 20 or 47, respectively, firstly moves the holding device 9, 45 with the stator 2 to the bending machine 5. The bending machine 5 (in particular in an azimuthal direction) bends the free ends 6 of the bar conductors 4 such that said free ends are mutually converged in particular in pairs or in groups of more than two free ends 6. The handling apparatus 20, 47 then moves the holding device 9, 43 with the stator 2 to the spreading machine 7 or 43, respectively. The spreading machine 7, 43 spreads the free ends 6 of the bar conductors 4 apart in the radial direction such that free ends 6 that are not to be welded to one another do not contact one another. Alternatively, it can be provided that the free ends 6 by means of the spreading machine 7 or 43, respectively, are firstly spread apart in the radial direction and then bent by means of the bending machine 5. In this case, the handling apparatus 20 or 47, respectively, firstly moves the holding device 9 or 45, respectively, to the bending machine 7 or 43, respectively, and then to the bending machine 5.

Subsequently, the handling apparatus 20, 47 moves the holding device 9, 45 with the stator 2 to the welding machine 8 or 44, respectively. The welding machine 8, 44 welds the free ends 6 of the bar conductors 4 to one another in pairs. Alternatively, it may be provided that the free ends 6 of more than two bar conductors 4 are in each case welded to one another. Subsequently, the handling apparatus 20, 47 moves the holding device 9, 45 with the stator 2 back to the loading and unloading station 17, 48. At the latter, the processed stator 2 is retrieved from the holding device 9, 45.

Alternatively, it would be conceivable for the stator 2 to be manufactured to be firmly clamped in the holding device 9 or 45 outside the manufacturing system 1, and for the holding device 9, 45 then to be introduced into the manufacturing circuit 42 or 46, respectively, by way of the loading and unloading station 7 or 48, respectively. After the manufacturing cycle, the holding device 9, 45 with the stator 2 could be discharged from the manufacturing circuit 42, 46 by way of the loading and unloading station 7, 48. Subsequently, the stator 2 could be released from the holding device 9, 45 outside the manufacturing system 1.

Figure 2C:
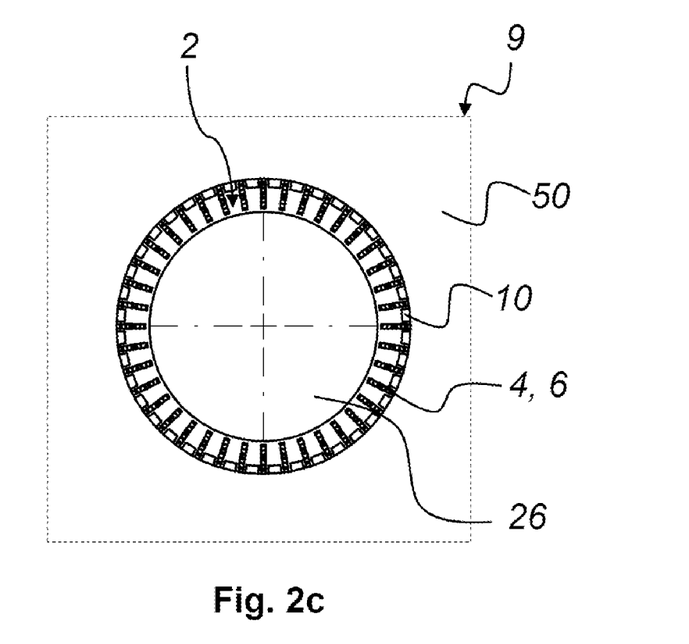
FIG. 2c shows a holding device according to the invention having a first set of fingers for holding a stator, wherein the fingers are in an opened position, in a schematic plan view.

FIG. 2c shows a holding device 9 according to the invention with a stator 2 in a plan view. The holding device 9 has a centering element 26. The centering element 26 is disposed radially within the free ends 6 of the bar conductors 4. In other words, the free ends 6 of the bar conductors 4 penetrate an intermediate space between the centering element 26 and a body 50 of the holding device 9.

The holding device 9 has a first set of fingers 10. The fingers 10 are mounted so as to be displaceable in the holding device 9. The fingers 10 in FIG. 2c are in a position disengaged in a radially outward manner, in which position the holding device 9 is opened.

Figure 2D:
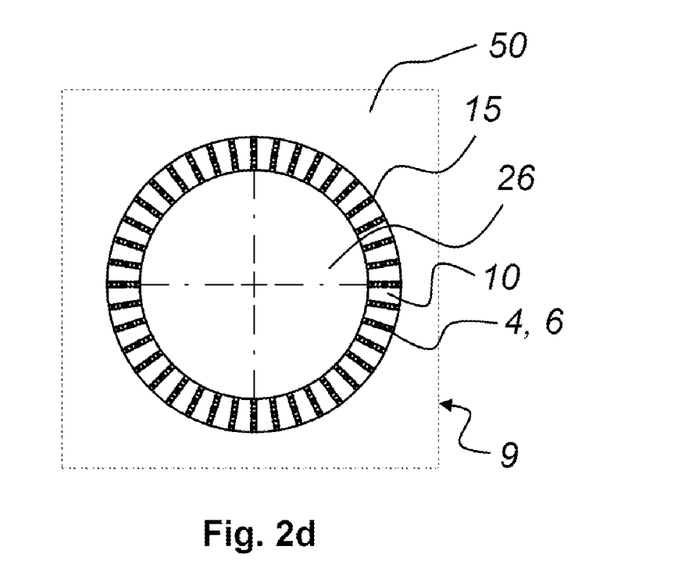
FIG. 2d shows the holding device of FIG. 2c, wherein the fingers are in a closed position, in a schematic plan view.

FIG. 2d shows the arrangement of FIG. 2c, wherein the fingers 10 of the holding device 9 are now in a position engaged in a radially inward manner, in which position the holding device 9 is closed. The fingers 10 in the closed position, by way of their radially inner end portion, on the first end side 11 of the main body 3 of the stator 2 (cf. FIG. 2a) engage between the bar conductors 4. The fingers 10 in the closed position bear on the centering element 26. The bar conductors 4 are jammed between the fingers 10. Furthermore, the bar conductors 4 of the radially innermost tier 12a (cf. FIG. 2b) bear on the centering element 26.

Figure 3A:
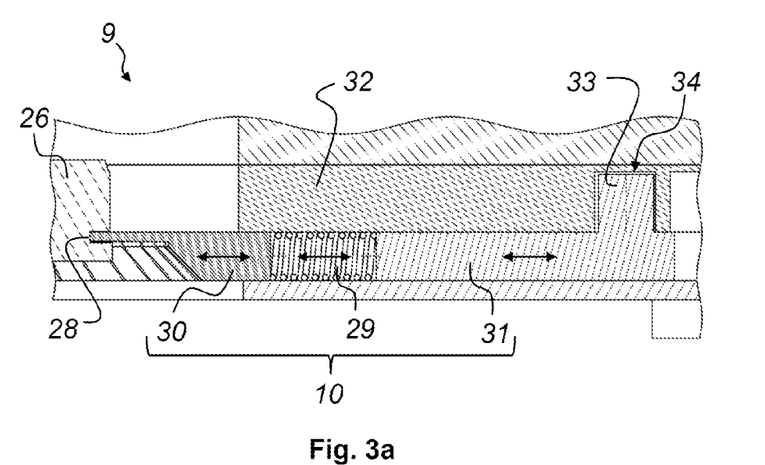
FIG. 3a shows a holding device according to the invention having a first set of fingers which between an engagement portion and a drive portion have an elastic element, wherein a first cam disk interacts with the engagement portions, in a schematic partial sectional view.

FIG. 3a shows a sub-region of the holding device 9 in a sectional illustration. One of the fingers 10 of the first set can be seen. The finger 10 has an engagement portion 30 and a drive portion 31. The engagement portion 30 and the drive portion 31 are coupled to one another by an elastic element 29, here a cylindrical coil spring. The holding device 9 in FIG. 3a is in the closed position. The engagement portion 30 of the finger 10 is engaged in a radially inward manner. The finger 10 by way of the engagement portion 30 thereof engages in a circumferential groove 28 configured on the centering element 26.

The drive portion 31 serves for displacing the engagement portion 30 between the closed position and the opened position not shown here. The finger 10 on the drive portion 31 has a pin 33. The pin 33 engages in a helical groove 34 in a first cam disk 32, cf. also FIG. 4c. The cam disk 32 is rotatably mounted in the holding device 9. The drive portion 31 is displaced in the radial direction when the cam disk 32 rotates. The movement of the drive portion 31 is transmitted to the engagement portion 30 by way of the elastic element 29. When the engagement portion 30 bears on the centering element 26, the drive portion 31 can be further advanced in the radially inward direction while increasing the spring force of the elastic element 29. In this way, the engagement portion 30 can be pretensioned against the centering element 26, or the bar conductors 4 to be jammed, respectively.

Figure 3B:
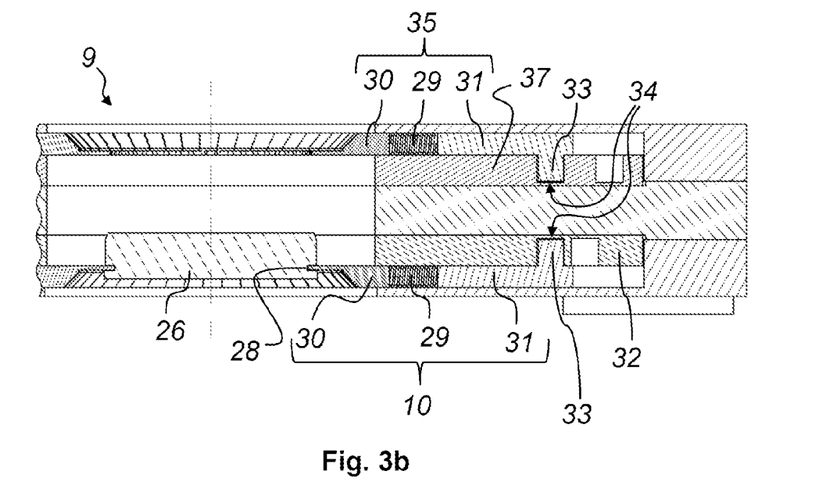
FIG. 3b shows the holding device of FIG. 3a, furthermore having a second set of fingers which are able to be moved by means of a second cam disk, in a schematic cross section.

FIG. 3b shows a larger, in comparison to FIG. 3a, section of the holding device 9 in a sectional view. It can be seen that the centering element 28 is configured in the form of a disk which on the circumference thereof has the circumferential groove 28.

In addition to the first set of fingers 10, the holding device 9 has a second set of fingers 35. The fingers 35 of the second set serve for engaging between the bar conductors 4 at the second end side 36 (cf. FIG. 2a) of the main body 3 of the stator 2. The fingers 10, 35 of both sets in FIG. 3b are in the closed position. It is to be noted that no centering element is provided for the fingers 35 of the second set.

The fingers 35 of the second set can be constructed and configured like the fingers 10 of the first set. The fingers 35 have in particular in each case one engagement portion 30, one drive portion 31 and an intervening elastic element 29. A second cam disk 37 which is rotatably mounted in the holding device 9 is provided for displacing the fingers 35 of the second set. The drive portions 31 of the fingers 35 have in each case one pin 33 which engages in a helical groove 34 of the second cam disk 37 (in a manner analogous to the fingers 10 of the first set). The second cam disk 37 can be configured so as to be mirror-symmetrical in relation to the first cam disk 32.

Figure 4A:
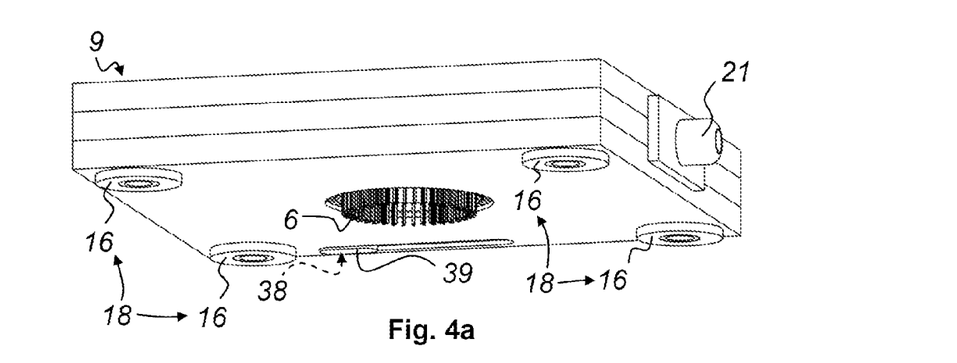
FIG. 4a shows a holding device according to the invention having a stator, wherein first components of a centering clamping system form a uniform interface of the holding device, in a schematic perspective view.
Figure 4B:
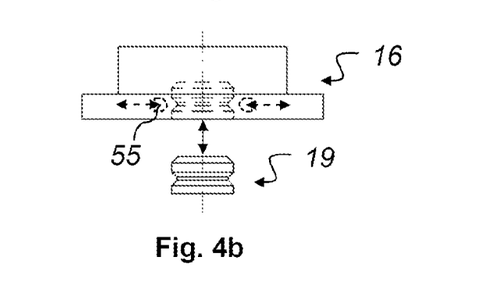
FIG. 4b shows a first component and a complementary component of the centering clamping system of the holding device of FIG. 4a, in a schematic lateral view.
Figure 4C:
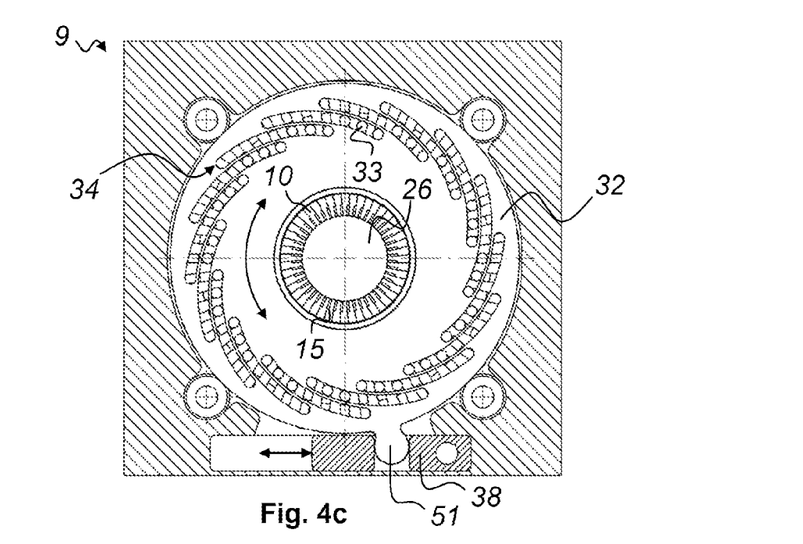
FIG. 4c shows the holding device of FIG. 4a in a schematic sectional view with a view toward a first cam disk.

FIG. 4c shows a horizontal section through the holding device 9. The first cam disk 32 has a plurality of helical grooves 34 in which a plurality of fingers 10 of the first set engage in each case by way of their pins 33. The pins 33 of the fingers 10 engaging in the same groove 34 are therefore at attached to the drive portions 31 at different radial positions. In contrast, the engagement portions 30 of all fingers 10 are of identical construction. The elastic elements 29 of all fingers 10 are also in each case mutually identical.

The fingers 10 have in each case one shoulder 15. The shoulder 15 serves for mutually compressing the bar conductors 4 in the radial direction, and for pressing said bar conductors against the centering element 26. In an alternative not illustrated, it is also conceivable for the fingers 10 to have in each case two shoulders 15.

The holding device 9 has a slide gate 38 for driving the cam disks 32, 37. The slide gate 38 is able to be displaced in a rectilinear manner in the holding device 9. The cam disks 32 and 37 engage in the slide gate 38 by way of in each case one appendage 51. A rotating movement of the cam disks 32, 37 can be effected by displacing the slide gate 38.

Figure 5A:
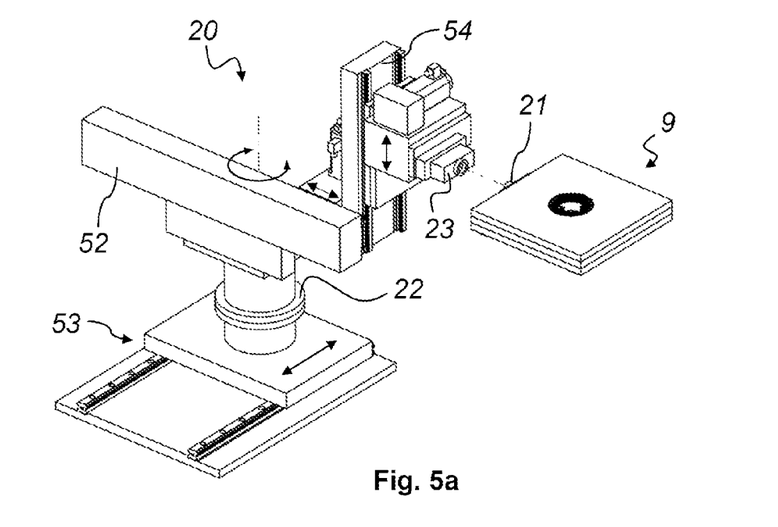
FIG. 5a shows a handling apparatus for a manufacturing system according to FIG. 1, and a holding device according to the invention having a coupling portion for the handling apparatus, in a schematic perspective view.
Figure 5B:
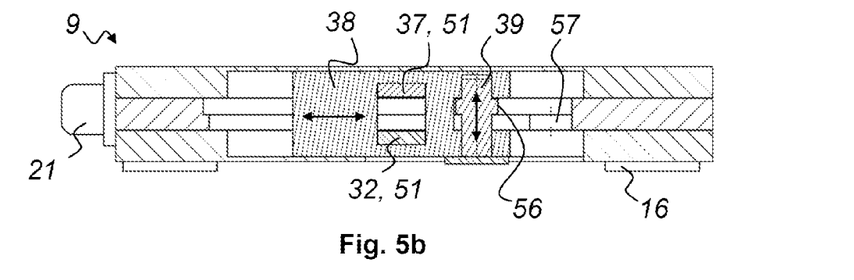
FIG. 5b shows a holding device according to FIG. 5a, having a slide gate for conjointly activating two cam disks, in a schematic cross section.

It can be seen in FIG. 5b that the slide gate 38 has a securing means 39. The securing means 39 in a non-activated state prevents any displacement of the slide gate 38. The non-activated securing means 39 prevents in particular the holding device 9 from opening. An unintentional release of the stator 2 from the holding device 9 can be prevented in this way. In the non-activated state, a collar 56 of the securing means 39 can be latched in a latching recess 57 of the holding device 9. The securing means 39 to this end can be pretensioned in a downward manner (in terms of the orientation in FIG. 5b). The securing means 39 is shown in FIG. 5b in an activated state. In the activated state of the securing means 39, the slide gate 38 can be displaced so as to open or close, respectively, the holding device 9 such that the stator 2 is released or jammed, respectively.

In order for the securing means 39 to be moved to the activated state (activated position), an activation element 40 is provided at the loading and unloading station 17 (cf. FIG. 1). When the holding device 9 is held on the loading and unloading station 17, the activation element 40 pushes the securing means 39 to the activated position. As a result, the collar 56 of the securing means 39 is released from the latching recess 57. The activation element 40 can then displace the slide gate 38 so as to open or close, respectively, the holding device 9.

It can furthermore be seen in FIG. 5b that the holding device 9 has a coupling portion 21, here a quick-change coupling portion. The holding device 9 can be connected to the handling apparatus 20 by means of the coupling portion 21. The handling apparatus 20 can then transport the holding device 9 between the machines 5, 7, 8, 17 of the manufacturing system 1.

FIG. 5a shows the handling apparatus 20 and the holding device 9. The handling apparatus 20 has a gripper 23 for receiving the coupling portion 21 of the holding device 9. The gripper 23 by way of a rotary table 22 is rotatable about a vertical axis and along an arm 52 able to be repositioned radially to the rotary table 22. Furthermore, the rotary table 22 is able to be repositioned in the horizontal direction by means of a guide installation 53. Moreover, the gripper by way of a cantilever 54 is able to be repositioned in the vertical direction.

FIG. 4a shows the holding device 9 in a perspective view. An activation portion of the previously described securing means 39 of the slide gate 38 can be seen in the rearward region of the holding device 9 in FIG. 4a.

The holding device 9 has a uniform interface 18 for fastening the holding device 9 to the bending machine 5, the spreading machine 7, the welding machine 8 and the loading and unloading station 17. The uniform interface 18 here comprises four coupling elements 16. The coupling elements 16 are configured as first components of a centering clamping system, here a zero-point clamping system.

FIG. 4b shows such a first component and a complementary second component of the centering clamping system. The first component is formed by one of the coupling elements 16. The second component is formed by a complementary receptacle 19. The coupling element 16 can be placed on the complementary receptacle 19. The coupling element 16 has clamping means 55. The coupling element 16 and the complementary receptacle 19 by means of the clamping means 55 can be fixed to one another in a defined relative position. To this end, the clamping means 55 are movable in a radially inward manner. In order to be able to release the coupling element 16 and the receptacle 19 from one another, or to be able to place the coupling element 16 on the receptacle 19, respectively, the clamping means 55 are movable in a radially outward manner. The clamping means 55 in FIG. 4b are in the state moved in a radially outward manner.

Four such complementary receptacles 19 are in each case provided on the bending machine 5, the spreading machine 7, the welding machine 8 and the loading and unloading station 17, cf. FIG. 1, said four complementary receptacles conjointly forming a receptacle installation which complements the uniform interface. The four complementary receptacles 19 here are in each case disposed for receiving the four corresponding coupling elements 16 of the holding device 9. The holding device 9 can thus be affixed on all machines 5, 7, 8, 17 of the first manufacturing circuit 42 of the manufacturing system 1 by way of the same first components of the centering clamping system. The coupling elements 16 thus conjointly form the uniform interface 18. The same applies in an analogous manner to the further holding device 45 and the second manufacturing circuit 46.

Figure 6:
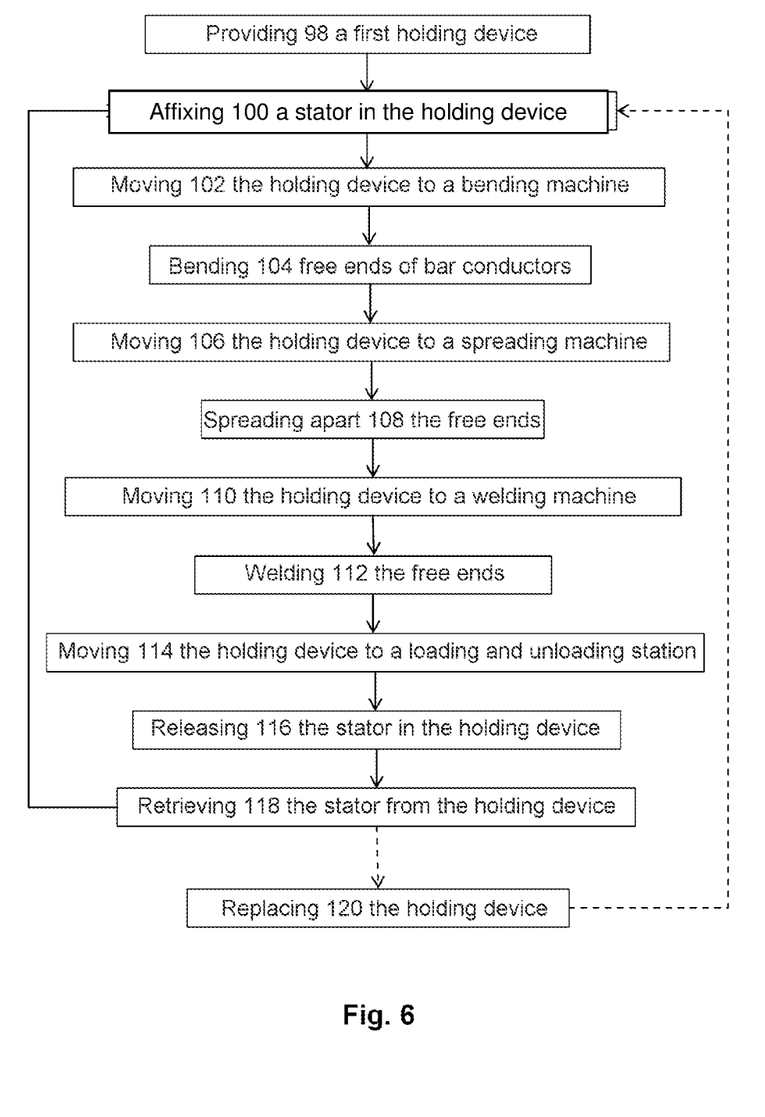
FIG. 6 shows a flow chart of a method according to the invention for manufacturing stators while using one of the manufacturing circuits of the manufacturing system of FIG. 1.

FIG. 6 shows a flow chart of a method for manufacturing stators 2 with bar conductors 4, cf. FIGS. 2a, 2b, by means of a manufacturing system, for example the manufacturing system 1 according to FIG. 1.

A first holding device 9 is firstly provided in a step 98. In a step 100, a stator 2 is then affixed on the first holding device 9. The stator 2 here can in particular be firmly clamped by engaging fingers 10, 35 of a first and second set in a radially inward manner. The fingers 10, 35 here engage between the bar conductors 4. While carrying out step 100, the holding device 9 is fastened to a loading and unloading station 17.

The holding device 9 with the stator 2 then in a step 102 is moved to a bending machine 5 by means of a handling apparatus 20. At the latter, the free ends 6 of the bar conductors 4 in a step 104 are bent such that free ends 6 to be welded to one another are mutually converged.

Subsequently, the holding device 9 with the stator 2 in a step 106 is moved to a spreading machine 7 by means of the handling apparatus 20. At said spreading machine, the free ends 6 in a step 108 are spread apart in the radial direction.

In a method variant not illustrated in more detail, steps 106 and 108 can be carried out prior to steps 102 and 104. In this variant, steps 106 and 108 thus follow step 100; steps 102 and 104 follow subsequently.

Following this, the holding device 9 with the stator 2 in a step 110 is moved to a welding machine 8 by means of the handling apparatus 20. At said welding machine, the free ends 6 are welded in pairs or multiples in a step 112.

The holding device 9 with the stator 2 in a step 114 now is moved back to the loading and unloading station 17 by means of the handling apparatus 20. The holding device 9 is fastened to the loading and unloading station 17. While carrying out steps 102 up to and including 114, the stator 2 is at all times fixed in the holding device 9. The stator 2 in a step 116 is then released in the holding device 9 in that the fingers 10, 35 are disengaged in a radially outward manner such that they no longer engage between the bar conductors 4. Finally, the stator 2 in a step 118 is retrieved from the holding device 9.

Further method cycles having the above-described steps 100 to 118 can then be carried out for manufacturing further stators 2 of the same type while using the same holding device 9. In FIG. 6, this is indicated by the continuous arrow from step 118 to step 100.

In parallel with the manufacturing cycles of the holding device 9 in the first manufacturing circuit 42, corresponding manufacturing cycles using a further holding device 45 can be carried out in a second manufacturing circuit 46 using the bending machine 5, a further spreading machine 43, a further welding machine 44, a further loading and unloading station 48 and a further handling apparatus 47. The manufacturing circuits 42, 46 here are cycled so as to be mutually offset (in temporal terms) such that the bending machine 5 can be utilized in both manufacturing circuits 42, 46. The holding devices 9 and 45 are typically of identical construction and provided for the same type of stator 2.

After one or a plurality of cycles using the first holding device 9, the holding device 9 in a step 120 can be replaced by a second holding device for another type of stator, cf. dashed arrow at the bottom of FIG. 6. The other type of stator can in particular be of a different size than the first type of stator 2. Correspondingly, the second holding device can differ from the first holding device 9 in terms of the size of the receptacle of said second holding device for the stator. In contrast, interfaces 18 for connecting the holding devices to the machines 5, 7, 8, 17 of the manufacturing system 1 are of identical configuration in the first holding device 9 and the second holding device for the stator of another type. Complexity in retooling the manufacturing system 1 in terms of fastening mechanisms can therefore be avoided or at least minimized when changing the type of stator to be manufactured.

When replacing 120 the first holding device 9 circulating in the first manufacturing circuit 42 with a second holding device for another type of stator, the further first holding device 47 circulating in the second manufacturing circuit 46 can also be replaced with a further second holding device for another type of stator, wherein the further second holding device for the second manufacturing circuit 46 in terms of construction is again typically identical to the second holding device for the first manufacturing circuit 42.

LIST OF REFERENCE SIGNS

Manufacturing system 1
Stator 2

Main body 3
Bent bar conductor 4a
Straight bar conductor 4b
Bar conductor 4
Bending machine 5
Free ends 6
Spreading machine 7
Welding machine 8
Holding device 9
First set of fingers 10
First end side 11
Annular tiers 12a-12d
Shoulder 15
Coupling elements 16
Loading and unloading station 17
Uniform interface 18
Complementary receptacle 19
Handling apparatus 20
Coupling portion 21
Rotary table 22
Gripper 23
Centering element 26
Circumferential groove 28
Elastic element 29
Engagement portion 30
Drive portion 31
First cam disk 32
Pin 33
Groove 34
Second set of fingers 35
Second end side 36
Second cam disk 37
Slide gate 38
Securing means 39
Activation element 40
First manufacturing circuit 42
Further spreading machine 43
Further welding machine 44
Further holding device 45
Second manufacturing circuit 46
Further handling apparatus 47
Further loading and unloading station 48
Platform 49
Body 50
Appendage 51
Arm 52
Guide installation 53
Cantilever 54
Clamping means 55
Collar 56
Latching recess 57
Providing 98 a first holding device
Establishing 100 a stator in the holding device
Moving 102 the holding device to a bending machine
Bending 104 free ends
Moving 106 the holding device to a spreading machine
Spreading apart 108 the free ends
Moving 110 the holding device to a welding machine
Welding 112 the free ends
Moving 114 the holding device to a loading and unloading station
Releasing 116 the stator in the holding device
Retrieving 118 the stator from the holding device
Replacing 120 the first holding device with a second holding device of another type

What is claimed is:

1. A manufacturing system for manufacturing a stator for an electric machine, in particular an electric motor, wherein the stator has an annular shaped main body defining a center axis and a multiplicity of bent and/or straight bar conductors disposed through a plurality of slots within a thickness of the main body parallel with the center axis, wherein the bar conductors have free ends protruding beyond a first end side of the main body, wherein the manufacturing system comprises:
   a bending machine configured for bending the free ends of the bar conductors;
   a spreading machine configured for spreading apart the free ends of the bar conductors in a radial direction in relation to the center axis;
   a welding machine configured for welding the free ends of, in each case, at least two bar conductors; and
   a holding device configured for securing the stator with the multiplicity of bent and/or straight bar conductors in a fixed position in relation to the holding device;
   wherein the holding device has at least a first set of fingers for engaging between the bar conductors at the first end side of the main body; and
   wherein the holding device comprising a uniform receptacle interface is configured to removably affixing the holding device onto the bending machine, the spreading machine and the welding machine while still securing the stator with the multiplicity of bent and/or straight bar conductors.

2. The manufacturing system as claimed in claim 1, furthermore having a loading and unloading station for the holding device.

3. The manufacturing system as claimed in claim 1, furthermore having a handling apparatus connected to a rotary table, configured for moving the holding device to the bending machine, the spreading machine and the welding machine, in particular wherein the holding device has a coupling portion, being a quick-change coupling portion, for the handling apparatus.

4. The manufacturing system as claimed in claim 1, wherein the holding device has a first component of a centering clamping system, in particular of a zero-point clamping system, and wherein the bending machine, the spreading machine and the welding machine have in each case a complementary component of the centering clamping system.

5. The manufacturing system as claimed in claim 1, wherein the holding device has a centering element for radially bearing the fingers of the first set.

6. The manufacturing system as claimed in claim 1, wherein the fingers, between an engagement portion and a drive portion of the respective finger, have in each case an elastic element.

7. The manufacturing system as claimed in claim 1, wherein the holding device has a first rotatable cam disk for displacing the fingers of the first set.

8. The manufacturing system as claimed in claim 7, wherein the holding device has a second set of fingers for engaging between the bar conductors at a second end side of the main body.

9. The manufacturing system as claimed in claim 8, wherein the holding device has a second rotatable cam disk for displacing the fingers of the second set.

10. The manufacturing system as claimed in claim 9, wherein the two cam disks are configured to be driven by a common slide gate.

11. The manufacturing system as claimed in claim 10, wherein the slide gate has a securing means which in a non-activated state precludes any displacement of the slide gate, and wherein an activation element for the securing means is configured on a loading and unloading station of the manufacturing system.

12. The manufacturing system as claimed in claim 1, wherein the bending machine, the spreading machine and the welding machine form a first manufacturing circuit for circulating the holding device, wherein the manufacturing system has a further spreading machine, a further welding machine and a further holding device for a stator, and wherein the bending machine, the further spreading machine and the further welding machine form a second manufacturing circuit for circulating the further holding device.

13. The manufacturing system as claimed in claim 1, wherein the manufacturing system has a common platform on which the components of the manufacturing system are arranged.

14. A holding device for a stator for an electric machine, in particular an electric motor, wherein the stator has an annular shaped main body defining a center axis and a multiplicity of bent and/or straight bar conductors disposed through a plurality of slots within a thickness of the main body parallel with the center axis, wherein the bar conductors have free ends protruding beyond a first end side of the main body;

wherein the holding device has at least a first set of fingers for engaging between the bar conductors at the first end side of the main body;

wherein the holding device has a uniform receptacle interface disposed on an outside surface; and wherein the holding device is configured to removably affixing to a bending machine, a spreading machine and a welding machine utilizing the uniform receptacle interface, wherein the bending machine is configured for bending the free ends of the bar conductors, the spreading machine is configured for spreading apart the free ends of the bar conductors in a radial direction in relation to the center axis and the welding machine is configured for welding the free ends of, in each case, at least two bar conductors.

* * * * *